United States Patent Office 3,470,075
Patented Sept. 30, 1969

3,470,075
PROCESS AND APPARATUS FOR FILTERING EFFLUENT PRODUCED FROM ALUMINUM REDUCTION CELLS
Arthur F. Johnson, 203 Creole Lane, Franklin Lakes, N.J. 07417
Filed Feb. 6, 1967, Ser. No. 614,294
Int. Cl. B01k 3/00; C22b 21/00
U.S. Cl. 204—67
11 Claims

ABSTRACT OF THE DISCLOSURE

This invention comprises an apparatus associated with an aluminum reduction cell and a process for directing the hot gases, vapors and dust issusing from the cell and passing them through a wall of pulverulent alumina supported between upright metal walls having a multiplicity of openings. The wall of alumina which may contain some admixed activated alumina, provides a physicophysical filter which entrains the dust, absorbs the fluoride vapors and gaseous compounds, absorbs the heat and returns the absorbed chemicals, dust and heat to the cell. The wall of alumina is preferably supplied from an upper feed hopper and as the wall of alumina moves downwardly it engages means which controls feeding the wall of alumina into the cell which also maintains the wall of alumina. The metal walls preferably have many spaced upwardly disposed baffles which prevent spillage of the alumina and intervening spaces through which the gases, vapors and dust pass into the alumina.

---

Figure 1:
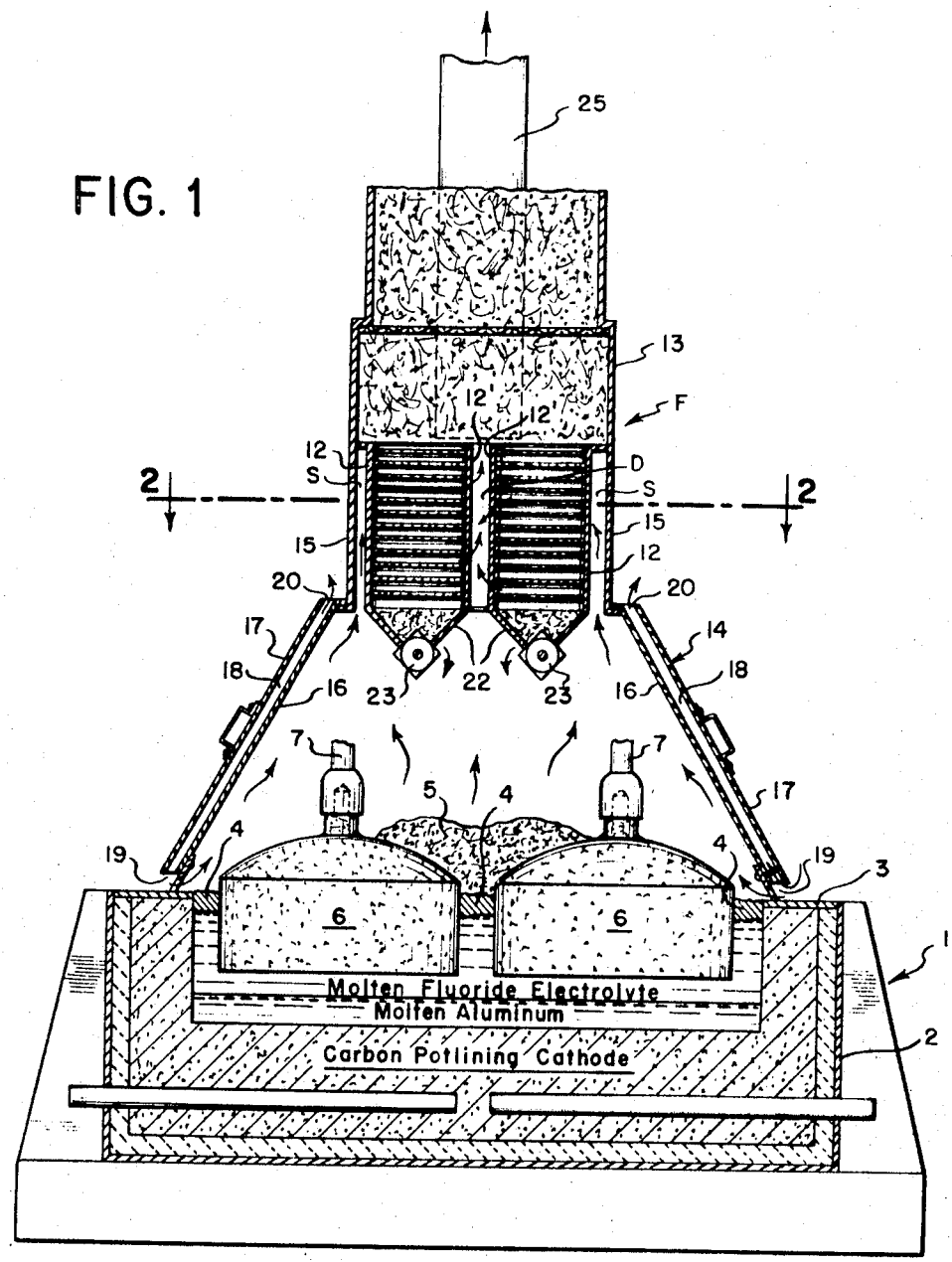

The apparatus of the invention comprises a hood-like structure over the cell for receiving and confining the hot effluent including gases, vapors and dust issuing from the cell and upright baffled walls for confining the wall of alumina, a receptacle for feeding the alumina into the space between the walls, and means for forcing or drawing the hot effluent through the wall of alumina. The wall of alumina is preferably located directly over the cell so that it can be fed into the fusion in the cell. The baffled walls may be formed of metal screens of a type having many closely spaced upwardly facing baffles and intervening slots or they may be a fabricated stationary or adjustable part of the walls. The metal walls may have open slots comprising 60 to 80% of the wall area. An important characteristic of the baffles is that they slope upwardly and outwardly at such an angle that they approximate the angle of repose of the alumina and the alumina is, accordingly, prevented from flowing out but the hot effluent can flow in through the spaces. The angle of repose of alumina is about 30° and the baffles should be set at such an angle and be individually dimensioned and spaced apart so that at the speed of the hot effluent the alumina does not become fluidized and overflow the baffles. One type of baffled screen which may be used is formed of expanded sheet steel and is illustrated in Patent 2,366,224, issued to H. Warp.

The filter apparatus of the invention is in operative connection with a cell for the electrolytic reduction of aluminum in a fused electrolyte and particularly with the hood enclosing the upper part of the cell for collecting the hot gas effluent from the cell and the bin for supplying the cell with alumina. The filtering apparatus may be located remote from the cell and connected therewith by a duct but preferably is mounted above the hood and supported by the hood, comprising a plurality of pairs of upright metal baffled walls each of which confines a wall of granular alumina, means for passing the hot effluent from the hood through the alumina walls whereby the hot effluent is absorbed by the alumina walls, means for supplying alumina from the bin to the baffled walls to maintain them filled with alumina and means, preferably a supporting bin below the filters with feed regulating valves, for feeding the alumina of the walls together with their absorbed hot effluent into the cell.

Some of the advantages of the invention are:
(1) The temperature of the process of filtration of hot effluent is limited only by the corrosion resistance and physical strength of metal used in the baffled walls.
(2) The baffled walls of the filters being compact and resistant to heat may be a part of the ore bin of each reduction cell thereby eliminating the bag house and associated equipment for its operation, and the difficulty of returning the materials recovered for return to the reduction cells.
(3) Because of the above advantages it is possible to reduce greatly the amount of cooling air allowed to enter the hood covered the cell and required to cool and dilute the hot effluent at 800 to 1000° C. before it may be filtered. The invention makes unnecessary cyclone dust collectors, bag houses, electrostatic precipitators or spray towers as conventionally used and requires practically no additional moving parts.

Figure 2:
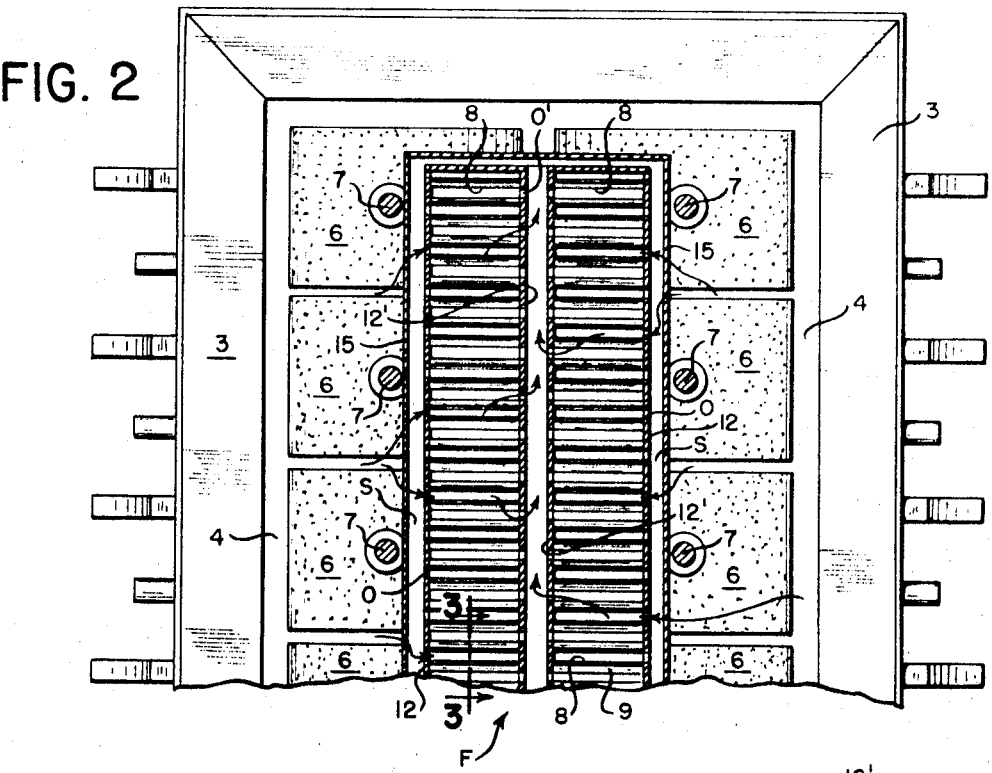
Figure 3:
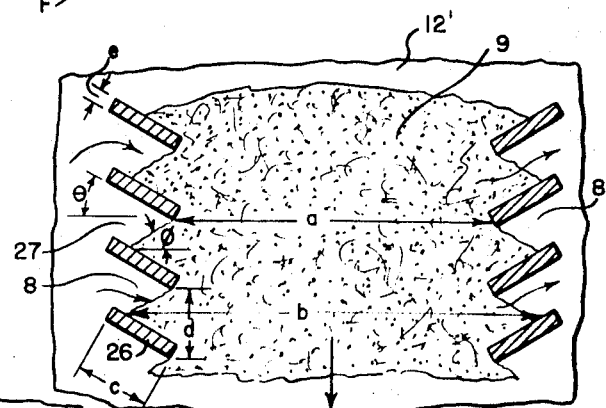
Figure 4:
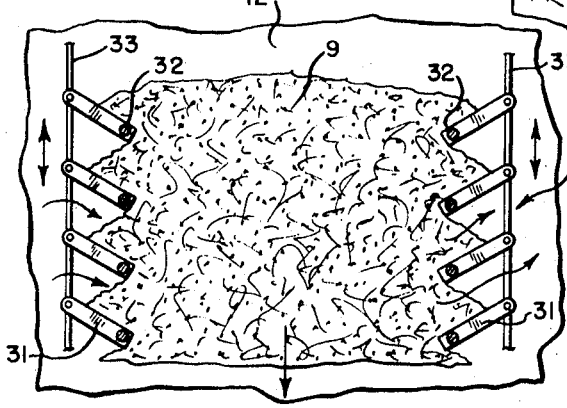

The invention will be better understood after considering the following description and drawings in which
FIG. 1 is a vertical section through apparatus of the invention;
FIG. 2 is a cross section at 2—2 of FIG. 1;
FIG. 3 is an enlarged fragmentary vertical sectional view of a pair of baffled walls taken at 3—3 of FIGS. 1 and 2, and
FIG. 4 is a vertical sectional view of modified baffled walls with adjustable baffles.

FIGS. 1 and 2 illustrate an assembly of apparatus of the invention located in the superstructure above an aluminum reduction cell 1 comprising the steel shell 2 and steel deck plate 3 enclosing the carbonaceous or other refractory lining which contains the molten fusion being electrolyzed which fusion freezes on its upper surface to a crust 4 on which the freshly fed alumina 5 rests and in which the anodes 6 are suspended by anode rods which conduct current into the fusion to electrolyze the alumina to molten aluminum. The filter assembly F of the invention includs several pairs of vertical walls 8 as best shown in FIG. 3 made of baffled steel plates which pairs each confine therebetween a wall or column of alumina 9. The baffled walls 8 are mounted between upright steel walls 12 which extend downwardly and are supported by the bin 13 which holds the supply of alumina for the cell. An upwardly tapered effluent collecting hood 14 is mounted on the deck plate 3, and the upper ends are connected to the side walls 15 of the alumina bin. The sloping walls of the hood are preferably formed of inner continuous plates 16 which are in connection with the deck plate 3 and with the walls 15. This connection with the deck plate need not be tight as some infilatration of air into the hood which mixes with the hot effluent can be beneficial. Exterior plates 17 are secured in spaced relation to the plates 16 to form channels 18 through which cooling air can circulate upwardly from the opening below 19 to the opening 20 above. As best shown in FIG. 1, hoppers 22 are mounted below the filter 8 and are connected to the walls 12 to receive the alumina 9 of the filters which passes downwardly. Feed valves 23 in the form of tip troughs are mounted in the hoppers 22 which valves are operated from time-to-time to feed the alumina into the cell.

As shown in FIG. 3 the adjacent pairs of walls 8 are closed at their ends by upright steel plates or walls 12, the opposite ends having openings O and adjacent pairs of walls 8 are closed by plates 12', the opposite ends having openings O'. The walls 12 are spaced from the walls 15 to provide spaces S for the hot effluent to enter the openings O and pass through the filters. The walls 12' form the sides of an upright duct D with which the openings O' connect and are outlets for the residual gases of the filtered hot effluent. One end of the duct D connects to a longitudinal header (not shown) serving several cells, which connects to a stack 25 in which a fan induces a draft to suck the hot effluent from the hood through the filters and discharge the inert gases to the atmosphere.

The embodiment of the invention illustrated in FIGS. 1, 2 and 3 has baffled walls in the form of steel screens preferably made according to said Patent 2,366,224. As shown in the enlarged scale in FIG. 3, the upright walls 8 are identical and consist of louvers or baffles 26 and interposed openings 27. The baffles 26 slope upwardly and outwardly at angles $\theta$ which are at least equal to the angle of repose of granular alumina. The angle of repose for such alumina is about 30°. Since the alumina may contain admixed fine particles of activated alumina, the angle may be enlarged 5 to 15% to insure the retention of the confined wall 9 of alumina. The spaces between the walls 8 may vary from less than one inch to several inches depending on the operating conditions. The shortest distance, $a$, of gas flow through the alumina and the longest straight distance, $b$, should be a multiple of several times the baffle widths, $c$, so that the gas being filtered will not channel but move relatively uniformly through all the granular alumina held between the baffle screens. Since such baffle screens are economically manufactured by slitting a sheet of metal a distance, $d$, and bending it outward, $c$ equals $d$ approximately. The area of openings in the screen through which gas may flow is reduced by a greater thickness of metal, $e$, or a greater angle from the horizontal $\theta$. The metal used to manufacture the baffles may be steel, anodized aluminum or other metals but steel is usually the most economical since it can be made relatively thin such as 0.01 inch and the distance $c$ and $d$ made 0.04 to 0.10 inch or more. The average thickness of the alumina wall ½ $(a+b)$ may be 0.10 to 0.50 or more but 0.25 inch will usually insure that no part of the screen is blocked by foreign matter. This is important since a blow-through must not be permitted to continue long in any filter wall. The porosity of cell grade alumina is about 50% and the resistance to flow of the gas through the above dimensioned example of filter wall at a velocity of one foot or less a minute will at the most only amount to a few inches of water pressure head or even less than 1 inch depending on the fineness of the alumina as well as other enumerated variables.

In conventional filtering in bag houses it is the accumulation of microscopic fume particles in the fabric pore spaces that inhibit gas flow and cause back pressure. An important feature of this invention is that the alumina used in the cell operation is used as a filter which returns the absorbed chemicals, dust and heat to the fusion.

FIG. 4 illustrates a modification of filter walls 30 in which the baffles 31 are mounted on pivots 32 connected to the walls 12 and 12' and the outer ends are pivotally connected to upright rods 33. These rods may be moved up or down as in a jalousie window to move all the baffles in unison to the desired slope. In this modification the slope of the filter baffles may be changed depending on the character of the alumina as it affects its angle of repose or may be changed to better clean all the alumina off the baffles when the filter is emptied.

In one method of practicing this invention about 100 parts of conventional granular cell grade alumina containing only 3% to 20% of minus 325 mesh particles and calcined to about 0.5% loss on ignition is mixed with 10 to 20 parts of activated alumina which may be about the same chemical grade of alumina but substantially all of a size less than 325 mesh and comparatively undercalcined so that the activated alumina has from 1.5% to 10%, preferably 4% to 8%, loss on ignition. As described in Canadian Patent 613,352, issued Jan. 24, 1961, the activated alumina is an efficient adsorber of fluoride gases. By mixing the activated alumina with conventional cell grade alumina dusting of the fine activated alumina is avoided.

In another method of practicing this invention only conventional cell grade alumina is utilized but this is slightly undercalcined to contain 1.0% or more loss on ignition. The atmospheric air infiltrating around the hood of the cell is then held down so that the temperature of the hot effluent to be filtered is 350° C. or more whereupon the undercalcined alumina is converted to aluminum fluoride by the fluoride gases to the extent these gases are present.

In FIGS. 1, 2 and 3 it is apparent that not all the baffle screen face is available for filter area since the slotted portions must necessarily be supported by uncut metal sheet. It is, however, easily possible for the baffle openings to constitute 60% to 80% of the screen sheet area.

It is an important feature of this invention that the assembly of spaced filters are automatically sealed above by the alumina in the ore bin which rests on the walls of alumina 9, and below by the alumina which fills the hopper—and on which the walls of alumina 9 rest. Thus the alumina used for reduction is forced to pass between the spaced baffle walls through which the fluoride containing hot and dusty gases are drawn so the heat and fluorides and dust are caught and enter the fusion with the alumina.

Although a utilization of this invention for the recovery of fluorides from aluminum reduction cells is described above, it is likewise possible to recover fluorides from effluent gases of other metallurgical operations such as fertilizer plants treating calcium fluoapatite. In this case limestone particles may be used between the baffled screens instead of alumina and biproduct calcium fluoride manufactured.

In any case the filter assembly may be located remote from the cells or furnaces from which fluorides are evolved with interconnecting ducts being used to carry the effluent gases, fume and dust. In some cases this may be advantageous where conventional cells and ductwork are already in existence and it is desired to replace conventional gas washing, electrostatic treatment or baghouse filters with the filtering process of this invention without greatly altering the cells. In this case the process of this invention has great utility in permitting smaller volumes of gas drawn from each cell or furnace since the filter is not harmed by high temperatures and yet has the efficient filtering inherent in passing through a layer of particles. Eliminating the need of filter cloth and lower horsepower with lesser volumes is more economical.

I claim:

1. A physico-chemical process for filtering and recovering the effluent from an aluminum reduction cell including fluoride vapors, gases, dust and heat which comprises collecting the effluent, passing the effluent through an upright confined wall of granular alumina, and moving the wall of alumina with the contained effluent into the fusion of the aluminum reduction cell from which the effluent was collected.

2. The process of claim 1 in which activated alumina is mixed with cell grade alumina to assist the recovery of fluorides.

3. The process of claim 1 in which only cell grade alumina slightly undercalcined but less than 3% loss on ignition is utilized in the filter, and the hot effluent filtered has a temperature of at least 350° C.

4. A physico-chemical process for recovering the hot effluent including fluoride gases, vapors, dust and heat from electrolyzing alumina in a fusion containing at least some fluorides which comprises diluting the hot effluent with some atmospheric air, passing the diluted hot effluent through a filter wall of granular alumina held between confining upright metal walls, the wall of alumina effecting a physico-chemical absorption of the fluorides, dust and heat, feeding the alumina by gravity from a supply above into the upright metal walls to maintain the walls of alumina, and passing the alumina with its contained fluorides, dust and heat by gravity into the fusion in the reduction cell.

5. The combination with a cell for the electrolytic reduction of aluminum in a fused electrolyte which comprises a hood enclosing the upper part of the cell for collecting the effluent from the cell and any air infiltrated therein, a filtering apparatus supported above the hood having a plurality of pairs of upright metal walls for combining a body of granular alumina, means for passing the effluent from the hood through the alumina body whereby the effluent and heat are absorbed by the alumina body, means for supplying alumina to the filtering apparatus to maintain it filled with alumina and means for feeding the alumina from said body together with the absorbed effluent into the cell.

6. The combination of claim 5 which comprises spaced upright baffled walls with openings therein for confining the alumina body, said baffles sloping upwardly at an angle at least equal to the angle of repose of the alumina and being so spaced that the alumina does not flow out through the openings.

7. The combination of claim 5 which comprises means associated with the hood to cool the electrolyte crust in the cell, a means for increasing the transmission of heat from the crust to the inside of the hood and increasing the removal of heat from the hood to outside to reduce the amount of cooling air.

8. The combination of claim 5 in which the filtering apparatus is located at a distance from the cell and is connected by duct means for receiving the effluent and passing the alumina into the cell.

9. Apparatus for the electrolytic reduction of aluminum from fluoride fusions which comprises a cell in which the fusion is reduced, a hood attached to the cell and extending upwardly therefrom for the collection of hot effluent from the reduction, a structure above the hood having supported therein a plurailty of upright filters, each filter consisting of two metal walls providing a space which is adapted to be filled with pulverulent alumina, each wall having a multiplicity of openings and means for confining the alumina, a receptacle above the filters for holding a supply of alumina which feeds into and maintains the filters filled with alumina, means for drawing the hot effluent from the reduction operation of the cell through the filters to absorb hot effluent and discharge the unabsorbed gases to the atmosphere, said filters being located above the cell so that the alumina in the filters can move downward by gravity carrying with it the absorbed hot effluent, and means to regulate the feeding of alumina from the filters into the cell so that they are maintained filled with alumina.

10. Apparatus as defined in claim 9 in which the metal walls have a multiplicity of outwardly and upwardly sloping baffles extending horizontally and openings between the adjacent baffles, the slope of the baffles being at least equal to the angle of repose of the alumina and their dimensions such that the alumina does not spill out of the filters.

11. Apparatus as defined in claim 9 in which the means to regulate the feeding of alumina into the cell is a holding bin for containing the alumina which has moved downward from the filters and for holding the alumina in the filters, and a feed means in the bin for periodically discharging the alumina from the bin onto the fusion crust in the cell.

References Cited

UNITED STATES PATENTS

| 2,564,837 | 8/1951 | Ferrand | 204—67 XR |
| 3,090,744 | 5/1963 | Muller et al. | 204—243 |

FOREIGN PATENTS

| 592,973 | 2/1960 | Canada. |
| 613,352 | 1/1961 | Canada. |

JOHN H. MACK, Primary Examiner

D. R. VALENTINE, Assistant Examiner

U.S. Cl. X.R.
204—243, 245, 247